US011769321B2

(12) United States Patent
Kozuka et al.

(10) Patent No.: US 11,769,321 B2
(45) Date of Patent: Sep. 26, 2023

(54) RISK PREDICTION METHOD

(71) Applicant: Panasonic Intellectual Property Corporation of America, Torrance, CA (US)

(72) Inventors: Kazuki Kozuka, Osaka (JP); Yasunori Ishii, Osaka (JP); Masahiko Saito, Osaka (JP); Tetsuji Fuchikami, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 997 days.

(21) Appl. No.: 15/450,395

(22) Filed: Mar. 6, 2017

(65) Prior Publication Data
US 2017/0262750 A1 Sep. 14, 2017

Related U.S. Application Data
(60) Provisional application No. 62/306,720, filed on Mar. 11, 2016.

(30) Foreign Application Priority Data

Nov. 1, 2016 (JP) ................................. 2016-214701

(51) Int. Cl.
*G06V 10/82* (2022.01)
*G06V 20/58* (2022.01)
(Continued)

(52) U.S. Cl.
CPC ............. *G06V 10/82* (2022.01); *G06N 3/045* (2023.01); *G06N 3/08* (2013.01); *G06N 5/04* (2013.01);
(Continued)

(58) Field of Classification Search
CPC .......... G06N 3/08; G06N 3/0454; G06N 5/04; G06K 9/00805; G06K 9/66; G08G 1/166; H04N 7/183
See application file for complete search history.

(56) References Cited

U.S. PATENT DOCUMENTS 5,541,590 A 7/1996 Nishio
5,832,187 A * 11/1998 Pedersen ................ G06Q 10/06
706/45
(Continued)

FOREIGN PATENT DOCUMENTS

CN 103578115 A 2/2014
EP 2495713 A1 9/2012
(Continued)

OTHER PUBLICATIONS

Jonathan Long et al., "Fully Convolutional Networks for Semantic Segmentation", The IEEE Conference on Computer Vision and Pattern Recognition (CVPR), pp. 3431-3440, Jul. 8, 2015.
(Continued)

*Primary Examiner* — Alexey Shmatov
*Assistant Examiner* — Beatriz Ramirez Bravo
(74) *Attorney, Agent, or Firm* — Greenblum & Bernstein, P.L.C.

(57) ABSTRACT

A risk prediction method is executed by a computer of a risk predictor using a convolutional neural network. The method includes making the convolutional neural network acquire an input image taken by an in-vehicle camera installed on a vehicle. The method also includes making the convolutional neural network estimate a risk area and a feature of the risk area, the risk area being in the acquired input image. The risk area has a possibility that a moving object may appear from the risk area into a travelling path of the vehicle, and the moving object may collide with the vehicle in a case where the vehicle simply continues running. The method further (Continued)

includes making the convolutional neural network output the estimated risk area and the estimated feature of the risk area as a risk predicted for the input image.

11 Claims, 20 Drawing Sheets

(51) Int. Cl.
| | | |
|---|---|---|
| *G06N 3/045* | (2023.01) | |
| *G06V 30/19* | (2022.01) | |
| *G06V 10/44* | (2022.01) | |
| *G06V 40/10* | (2022.01) | |
| *G06N 3/08* | (2023.01) | |
| *G06N 5/04* | (2023.01) | |
| *G08G 1/16* | (2006.01) | |
| *H04N 7/18* | (2006.01) | |

(52) U.S. Cl.
CPC ............ *G06V 10/454* (2022.01); *G06V 20/58* (2022.01); *G06V 30/19173* (2022.01); *G06V 40/103* (2022.01); *G08G 1/166* (2013.01); *H04N 7/183* (2013.01)

(56) References Cited

U.S. PATENT DOCUMENTS

| | | | |
|---|---|---|---|
| 2010/0076621 A1 | 3/2010 | Kubotani et al. | |
| 2010/0088264 A1* | 4/2010 | Teverovskiy | G16H 50/20 706/46 |
| 2010/0191391 A1 | 7/2010 | Zeng | |
| 2013/0010112 A1* | 1/2013 | Goto | G06K 9/00805 348/148 |
| 2013/0194127 A1* | 8/2013 | Ishihara | H01Q 1/3283 342/70 |
| 2014/0037138 A1 | 2/2014 | Sato et al. | |
| 2014/0063248 A1 | 3/2014 | Sakagami et al. | |
| 2015/0363717 A1* | 12/2015 | Lim | G06Q 10/0633 705/4 |
| 2017/0032509 A1* | 2/2017 | Mannar | G06T 7/73 |
| 2017/0083747 A1* | 3/2017 | Guan | G06K 9/0063 |
| 2017/0101056 A1* | 4/2017 | Park | B60R 1/00 |
| 2017/0187963 A1* | 6/2017 | Lee | G06F 3/013 |
| 2017/0220879 A1 | 8/2017 | Nakamura et al. | |
| 2017/0238909 A1* | 8/2017 | Shin | A61B 8/5284 |

FOREIGN PATENT DOCUMENTS

| | | | | |
|---|---|---|---|---|
| EP | 2693416 A2 | 2/2014 | | |
| JP | 2008-021269 A | 1/2008 | | |
| JP | 5035040 B2 * | 9/2012 | | |
| JP | 5210233 B2 * | 6/2013 | .......... | B60T 8/17558 |
| JP | 5401344 B2 * | 1/2014 | ............ | G08G 1/166 |
| JP | 2016-031576 A | 3/2016 | | |
| WO | 2008/126389 | 10/2008 | | |

OTHER PUBLICATIONS

The Extended European Search Report, dated Jul. 28, 2017 from the European Patent Office (EPO), for the related European Patent Application No. 17160068.7.
Office Action from the European Patent Office, dated Feb. 28, 2020, for the related European Patent Application No. 17160068.7.
Andrej Karpathy: "CS231n Convolutional Neural Networks for Visual Recognition", Apr. 19, 2015 (Apr. 19, 2015), XP055293763.
Jonathan Long et al: "Fully Convolutional Networks for Semantic Segmentation", 2015 IEEE Conference on Computer Vision and Pattern Recognition (CVPR), vol. abs/1411.4038v2, Mar. 8, 2015 (Mar. 8, 2015), pp. 1-10, XP055294644.
Chinese Search Report (English Language Translation), dated Oct. 25, 2021, for the related Chinese Patent Application No. 201710099249.6.
Chinese Search Report (English Language Translation), dated Aug. 18, 2022, for the related Chinese Patent Application No. 201710099249.6.

* cited by examiner

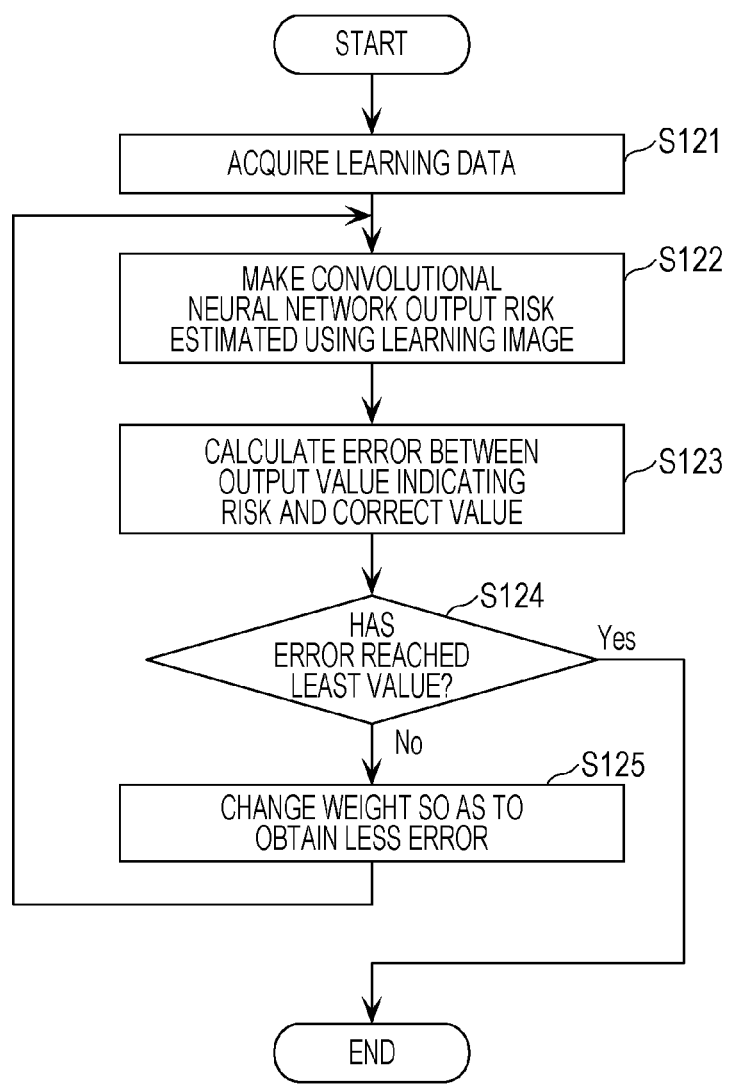

RISK PREDICTION METHOD

BACKGROUND

1. Technical Field

The present disclosure relates to a risk prediction method.

2. Description of the Related Art

A driving assist apparatus for assisting a driver of a vehicle to confirm safety is disclosed, for example, in Japanese Patent No. 4967015. This driving assist technique is capable of detecting, accurately and with early timing, a high-risk moving object that suddenly changes its moving speed in a manner unpredictable by a driver, which may cause an accident. An example of such a high-risk moving object is a pedestrian who suddenly starts to run when a signal at an intersection is going to turn red from blue.

SUMMARY

In one general aspect, the techniques disclosed here feature a risk prediction method executed by a computer of a risk predictor using a convolutional neural network, the method including making the convolutional neural network acquire an input image taken by an in-vehicle camera installed on a vehicle, making the convolutional neural network estimate a risk area and a feature of the risk area, the risk area being in the acquired input image, the risk area having a possibility that a moving object may appear from the risk area into a travelling path of the vehicle and the moving object may collide with the vehicle in a case where the vehicle simply continues running, and then making the convolutional neural network output the estimated risk area and the estimated feature of the risk area as a risk predicted for the input image.

The present disclosure makes it possible to realize a risk prediction method capable of predicting a risk area having a possibility of causing a dangerous situation for a running vehicle.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 11 is a flow chart illustrating a learning process performed by a learning apparatus;

DETAILED DESCRIPTION

Figure 1:
FIG. 1 is a block diagram illustrating an example of a configuration of a risk predictor according to a first embodiment.

Underlying Knowledge Forming Basis of the Present Disclosure

In the driving assist apparatus disclosed in Japanese Patent No. 4967015, a dangerous situation is predicted simply by watching a change in speed of a moving object which is actually seen. That is, in the driving assist apparatus disclosed in Japanese Patent No. 4967015, it is difficult to detect an area (risk area) such as a region behind a bus at rest or the like from which there is a possibility that a pedestrian may suddenly appear after the pedestrian gets off the bus and the pedestrian may collide with a vehicle.

In view of the above, the present disclosure provides a risk prediction method capable of predicting a risk area likely to cause a dangerous situation for a running vehicle.

In recent years, a drastic advance has been achieved in image recognition performance by use of deep learning. The deep learning is known as a method of machine learning using a multilayer neural network. In many cases, a convolutional neural network (CNN) is employed as the multilayer neural network. The convolutional neural network includes a multilayer neural network that repeatedly performs convolution and pooling on a local area.

The convolutional neural network includes a convolutional layer that extracts a feature by performing a convolution process using a plurality of filters, a pooling layer that ensures local invariance of data by performing a pooling process to group responses together in a particular area, and a fully connected layer that performs recognition based on a probability using a softmax function or the like.

However, the image recognition process using such a convolutional neural network has a problem that the process cannot be performed on a real-time basis.

To handle the above-described situation, it has been proposed (see, for example, Jonathan Long, Evan Shelhamer, Trevor Darrell, "Fully Convolutional Networks for Semantic Segmentation", The IEEE Conference on Computer Vision and Pattern Recognition (CVPR), 2015, pp. 3431-3440) to configure a convolutional neural network such that a fully connected layer in the convolutional neural network is replaced with a convolutional layer. By using the convolutional neural network (fully convolutional neural network) configured in this manner, it is possible to perform an image recognition process in real time.

In view of the above, the inventors of the present disclosure have gotten an idea that the problems described above can be solved using a fully convolutional neural network.

In an aspect, the present disclosure provides a risk prediction method executed by a computer of a risk predictor using a convolutional neural network, the method including making the convolutional neural network acquire an input image taken by an in-vehicle camera installed on a vehicle, making the convolutional neural network estimate a risk area and a feature of the risk area, the risk area being in the acquired input image, the risk area having a possibility that a moving object may appear from the risk area into a travelling path of the vehicle and the moving object may collide with the vehicle in a case where the vehicle simply continues running, and then making the convolutional neural network output the estimated risk area and the estimated feature of the risk area as a risk predicted for the input image.

Using this technique according to the present aspect, it is possible to estimate a risk from an acquired input image, and thus it is possible to realize a risk prediction method capable of predicting a risk area where a dangerous situation for a running vehicle may occur.

In the method, for example, in the outputting, the convolutional neural network may be made to estimate a degree of risk of the risk area as the feature of the risk area and output, as the risk, a likelihood map indicating the estimated risk area and the degree of risk of the risk area.

In the method, for example, in the outputting, the convolutional neural network may be made to estimate a type of the moving object related to the risk area as the feature of the risk area and output, as the risk, the estimated risk area and the type.

The risk prediction method may further include making the convolutional neural network, before the acquiring of the input image, learn a weight of the convolutional neural network by using a learning image including the risk area and an annotated image generated by adding an annotation indicating the risk area to the learning image such that the weight for estimating the risk area in the learning image and the feature of the risk area is learned.

The learning may include making a first neural network, which is a convolutional neural network including a fully connected layer, learn a first weight of the first neural network by using a risk area image and a safe area image which are each a partial area of the learning image, the risk area image being the area added with the annotation indicating the risk area, the safe area image being an area to which the annotation is not added, such that the first weight of the first neural network for determining whether the partial area is a safe area or risk area is learned, assigning the learned first weight as an initial value of a weight of a second neural network having a configuration obtained by changing the fully connected layer of the first neural network to a convolutional layer, and making the second neural network learn a second weight of the second neural network for estimating the risk area in the learning image and the feature of the risk area by using the learning image including the risk area and the annotated image generated by adding the annotation indicating the risk area to the learning image, thereby learning the weight of the convolutional neural network having the same configuration as that of the second neural network.

The risk prediction method may further include acquiring a plurality of temporally successive images taken by an in-vehicle camera installed on a vehicle, determining a risk area included in at least part of the plurality of acquired images and having a possibility that a moving object may appear from the risk area into a travelling path of the vehicle and the moving object may collide with the vehicle in a case where the vehicle simply continues running, and adding an annotation indicating the determined risk area to the at least part of the plurality of images, wherein in the learning, the at least part of the plurality images having the added annotation and images corresponding to the at least part of the plurality of images are acquired as the learning image and the annotated image, and the weight of the convolutional neural network is learned using the acquired learning image and the annotated image.

In the method, for example, the risk area may be an area including a part of an area of a hiding object existing in the learning image in a state in which the moving object is hidden behind before the moving object appears from the hiding object into the travelling path.

In the method, for example, the risk area may be an area between two or more moving objects including a person at least one of which has a possibility of moving toward the other one of the moving objects and crossing the travelling path of the vehicle.

For example, the annotation may indicate the risk area and a category of the moving object related to the risk area.

For example, the annotation may indicate the risk area and control information including information in terms of a brake strength or a steering wheel angle of the vehicle as of when the learning image is taken.

For example, the annotation may be segment information on the risk area.

For example, at least one of the acquiring and the outputting may be performed by a processor of the computer.

Note that each embodiment described below is for illustrating a specific example of the present disclosure. That is, in the following embodiments of the present disclosure, values, shapes, constituent elements, steps, the order of steps, and the like are described by way of example but not limitation. Among constituent elements described in the following embodiments, those constituent elements that are not described in independent claims indicating highest-level concepts of the present disclosure are optional. The details of the above-described embodiments may be combined.

First Embodiment

A risk prediction method by a risk predictor 10 according to a first embodiment is described below with reference to drawings.

Configuration of Risk Predictor 10

Figure 2:
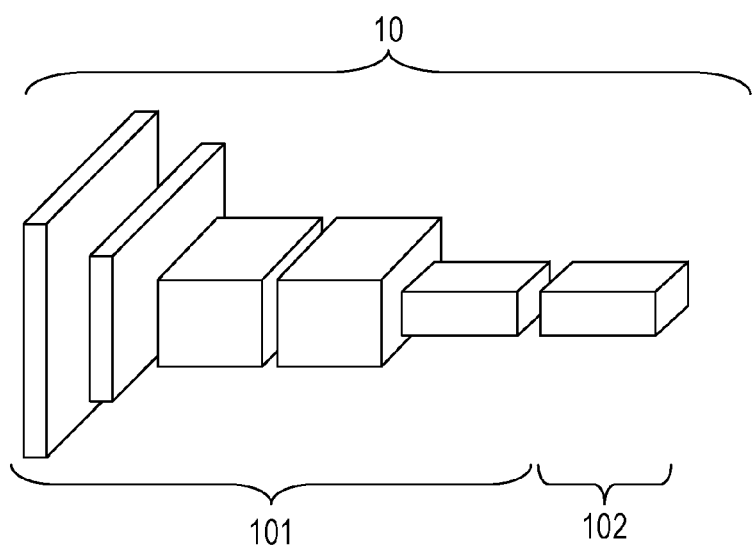
FIG. 2 is a diagram illustrating an outline of a structure of a convolutional neural network used by the risk predictor shown in FIG. 1.
Figure 3:
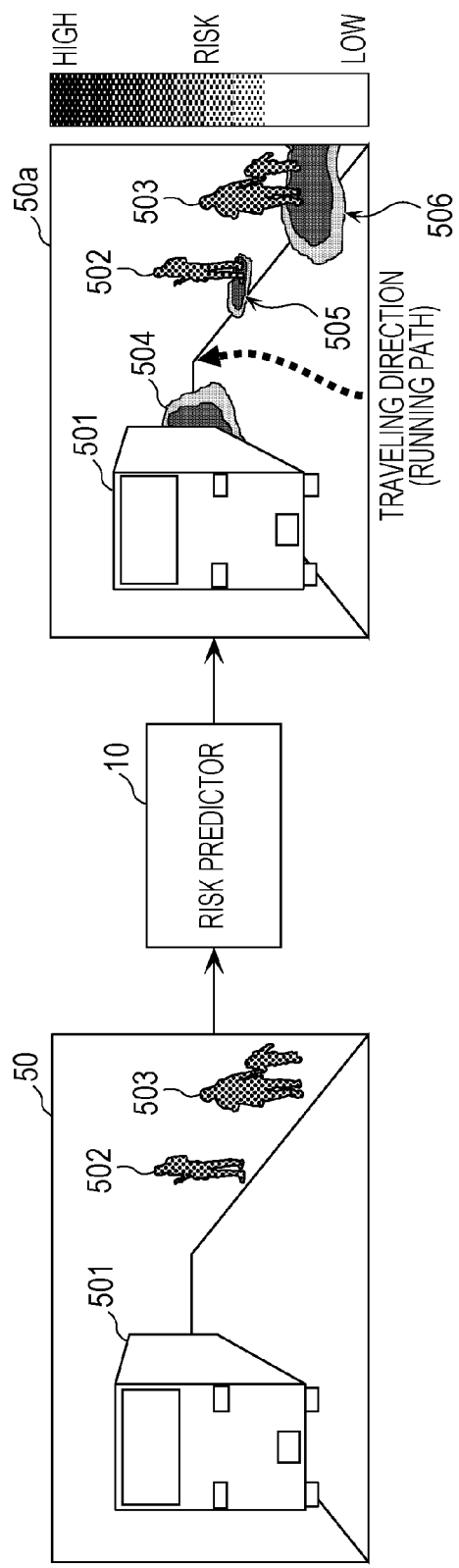
FIG. 3 is a diagram illustrating an example of a result of a prediction performed by the risk predictor according to the first embodiment.

FIG. 1 is a block diagram illustrating an example of a configuration of the risk predictor 10 according to the first embodiment. FIG. 2 is a diagram illustrating an outline of a structure of a convolutional neural network used by the risk predictor 10 shown in FIG. 1. FIG. 3 is a diagram illustrating an example of a result of a prediction performed by the risk predictor 10 according to the present embodiment.

The risk predictor 10 shown in FIG. 1 is a risk predictor using a convolutional neural network and is realized using a computer or the like. The convolutional neural network used in the risk predictor 10 includes, for example, as shown in FIG. 2, a convolutional layer 101 and a convolutional layer 102 wherein a fully connected layer is replaced by the convolutional layer 102.

The convolutional neural network is widely used in the field of the image recognition to extract a feature value from a two-dimensional image by performing convolution on the image using a filter. As described above, the convolutional neural network includes a multilayer network configured to repeat convolution and pooling. In the convolutional neural network, coefficients (weights) of filters of the convolutional layer are learned using a large amount of learning data such as a large number of learning images. These coefficients (weights) are obtained by repeating convolution using the filters and pooling for grouping responses together in a particular area by using a large amount of data thereby achieving invariance for varieties. It is known that the discrimination performance of the convolutional neural network depends on the filters of the convolutional layer.

When the risk predictor 10 shown in FIG. 1 receives an input image taken by an in-vehicle camera, the risk predictor 10 estimates, by using the convolutional neural network such as that shown in FIG. 2, a risk area in the input image and a feature thereof. Note that the risk area is an area that may cause a dangerous situation for a running vehicle. The risk predictor 10 outputs a result as a predicted risk. In the prediction by the risk predictor 10, when an area in the input image has higher similarity to a partial area of an image immediately before an image that caused, in the past, a dangerous situation such as a sudden appearance of a person, a higher risk is predicted. That is, the higher the similarity of the area in the input image to an area resulting in a past risk, the higher the predicted risk.

More specifically, the risk predictor 10 shown in FIG. 1 acquires an input image taken by an in-vehicle camera installed on a vehicle. The risk predictor 10 estimates the acquired input image, by using the convolutional neural network, to detect a risk area and a feature thereof having a possibility that a moving object may appear into a travelling path of the vehicle and if the vehicle simply continues the current travelling, the vehicle may collide with that moving object. The risk predictor 10 outputs the detected risk area and the feature thereof as a predicted risk associated with the input image. In this process, the risk predictor 10 estimates a degree of risk for the risk area as the feature of this risk area, and outputs, as the predicted risk, a likelihood map indicating the estimated risk area and the degree of risk of the risk area.

In the specific example described below, it is assumed by way of example that the risk predictor 10 acquires an image 50, as the input image, including a bus 501 at rest and persons (pedestrians) 502 and 503. In this situation, the risk predictor 10 estimates that an area behind the bus 501 at rest, an area of the person 502, and an area of the person 503 are risk areas in the image 50. The risk predictor 10 then generates an image 50a on which a degree of risk (likelihood) of each risk area estimated in the image 50 is superimposed, and outputs the resultant image 50a as a predicted risk. The image 50a includes a likelihood map, superimposed thereon, indicating a likelihood 504 for the area behind the bus 501 at rest, a likelihood 505 for the area of the person 502, and a likelihood 506 for the area of the person 503. The likelihood indicates a degree of risk for the vehicle to have a collision. In the present embodiment, even when there is no person seen in an area, if the area is such an area having a high probability that a person may appear suddenly from the area, then the likelihood is set to indicate a high risk.

The manner of outputting the risk by the risk predictor 10 is not limited to the likelihood map such as that shown in FIG. 3 indicating a risk area and a degree of risk thereof. Another example is described below with reference to FIG. 4.

Figure 4:
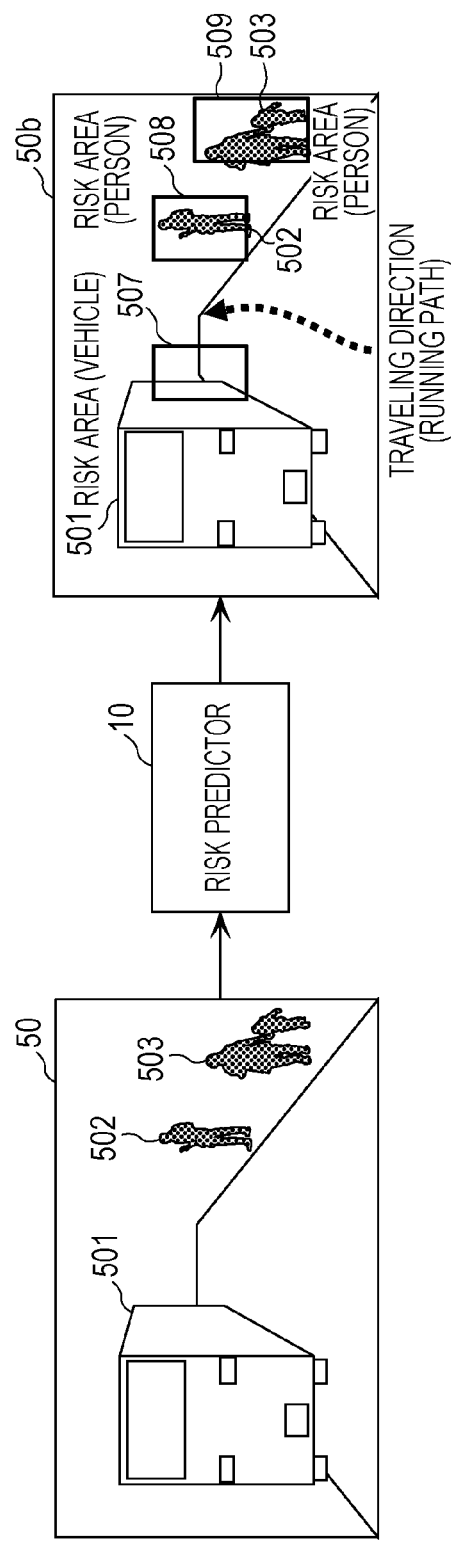
FIG. 4 is a diagram illustrating another example of a result of a prediction performed by the risk predictor according to the first embodiment.

FIG. 4 is a diagram illustrating an example of a result of a prediction performed by the risk predictor 10 according to the present embodiment. In FIG. 4, similar elements to those in FIG. 3 are denoted by similar reference numerals, and a further detailed description thereof is omitted.

The risk predictor 10 estimates that an area 507 behind a bus 501 at rest, an area 508 of a person 502, and an area 509 of a person 503 are risk areas in an image 50 acquired as an input image. The risk predictor 10 then outputs an image 50b on which the risk areas detected in the image 50 and labels indicating categories thereof are superimposed. That is, the image 50b output by the risk predictor 10 is generated such that the area 507 and a label "risk area (vehicle)" indicating a category of the area 507, the area 508 and a label "risk area (person)" indicating a category of the area 508, and the area 509 and a label "risk area (person)" indicating a category of the area 509 are superimposed on the image 50. In this case, the type of a moving object related to the area 507 estimated as a risk area in the image 50b is "vehicle", and thus a label "risk area (vehicle)" is superimposed to indicate the category of the risk area. Similarly, the type of a moving object related to each of the areas 508 and 509 estimated as risk areas in the image 50b is "person", and thus a label "risk area (person)" is superimposed to indicate the category of these risk areas.

As described above, the risk predictor 10 may operate such that the type of the moving object related to the risk area is estimated as the feature of the risk area, and the estimated risk area and the type are output as the risk.

Prediction Process by Risk Predictor 10

Next, a prediction process by the risk predictor 10 according to the present embodiment is described below with reference to drawings.

Figure 5:
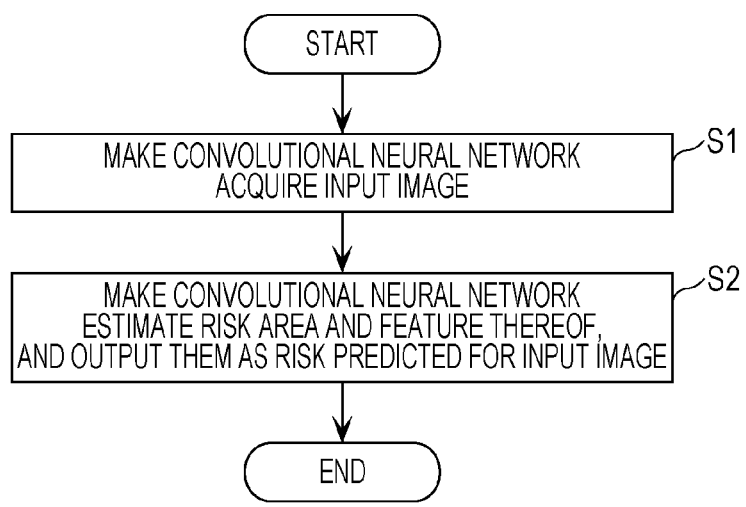
FIG. 5 is a flow chart illustrating an example of a prediction process performed by a risk predictor according to the first embodiment.

FIG. 5 is a flow chart illustrating an example of the prediction process performed by the risk predictor 10 according to the present embodiment.

As shown in FIG. 5, first, a computer of the risk predictor 10 makes the convolutional neural network acquire an input image taken by an in-vehicle camera installed on a vehicle (S1). More specifically, in the present embodiment, the computer of the risk predictor 10 makes the convolutional neural network acquire an image, such as the image 50 shown in FIG. 5, as the input image.

Next, the computer of the risk predictor 10 makes the convolutional neural network estimate a risk area and a feature thereof, and output them as a predicted risk associated with the input image (S2). More specifically, the computer of the risk predictor 10 makes the convolutional neural network estimate a risk area and a feature thereof in the input image acquired in S1 to detect an area having a possibility that a moving object may appear from the area into a travelling path of the vehicle and if the vehicle simply continues the current travelling, the vehicle may collide with that moving object. The detected risk area and the feature thereof are output as a predicted risk associated with the input image.

In the present embodiment, the computer of the risk predictor 10 makes the convolutional neural network estimate the degree of risk of the risk area as the feature of this risk area and output, as the predicted risk, a likelihood map indicating the detected risk area and the degree of risk of the risk area. For example, the computer of the risk predictor 10 makes the convolutional neural network output an image such as the image 50a shown in FIG. 3 as the predicted risk.

Alternatively, as described above, the computer of the risk predictor 10 may make the convolutional neural network estimate the type of the moving object related to the risk area as the feature of the risk area, and output the estimated risk area and the type of the risk area as the risk.

Effects of the Risk Predictor 10

As described above, the risk predictor 10 according to the first embodiment is capable of estimating an input image taken by an in-vehicle camera installed on a vehicle to detect a risk area in the input image and a feature of the risk area. More specifically, for example, the risk predictor 10 according to the first embodiment is capable of detecting a risk area where a dangerous situation for the running vehicle may occur, even such an area behind a bus at rest from which a pedestrian, not seen yet, may suddenly appear after getting off the bus.

The risk predictor 10 may be installed, for example, on an automated driving vehicle such that the vehicle is capable of predicting a risk area where a dangerous situation may occur from an image taken by an in-vehicle camera, and is capable of controlling driving of the vehicle so as to avoid the predicted risk area, which makes it possible to perform driving more safely.

Learning Process by Risk Predictor 10

A learning process for realizing the risk predictor 10 is described below. In the following description, a convolutional neural network 10a denotes a convolutional neural network that is obtained after being trained via a learning process so as to function as the convolutional neural network used in the risk predictor 10.

Figure 6:
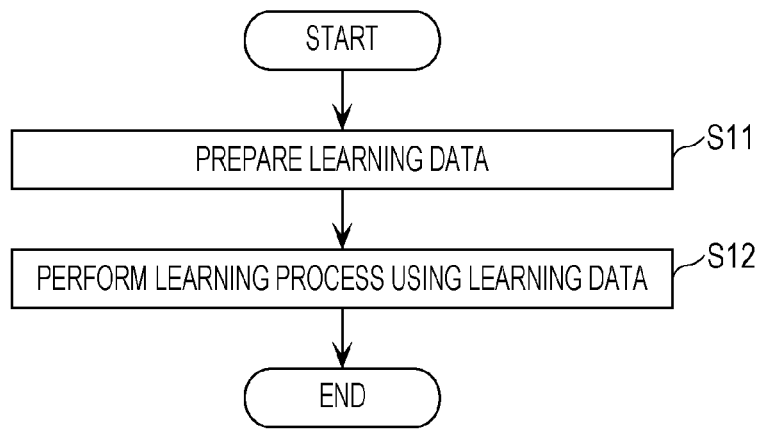
FIG. 6 is a flow chart illustrating an outline of a learning process performed by a convolutional neural network according to the first embodiment.

FIG. 6 is a flow chart illustrating an outline of the learning process performed by the convolutional neural network 10a according to the present embodiment. FIGS. 7A to 7D are examples of learning data prepared in step S1. FIG. 8 is a diagram illustrating an example of a set of a risk area and a feature thereof output as a result of the learning process.

First, learning data is prepared (S11). More specifically, a set of a learning image including a risk area and an annotated image generated by adding an annotation indicating the risk area to the learning image is prepared as learning data.

The learning data is described in further detail below with reference to FIGS. 7A to 7D.

Figure 7A:
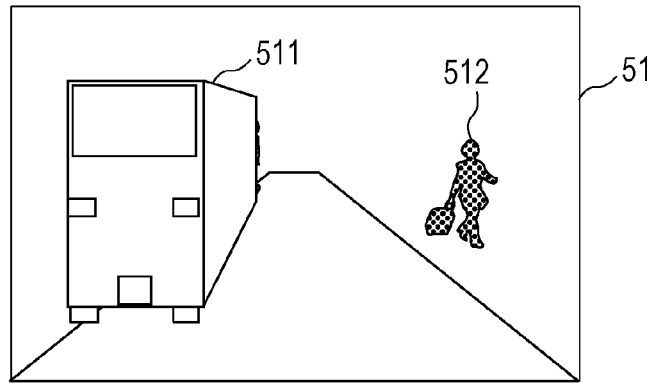
FIG. 7A is a diagram illustrating learning data prepared in step S1.
Figure 7B:
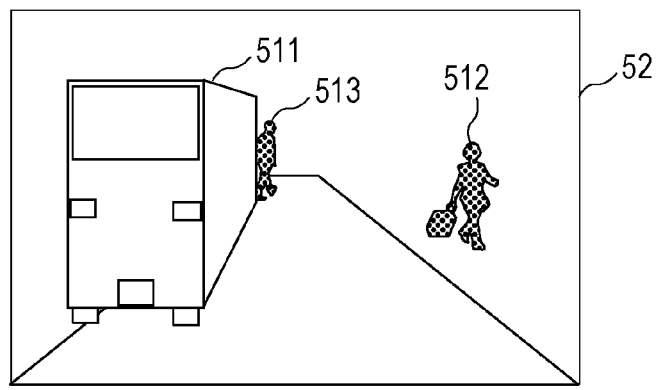
FIG. 7B is a diagram illustrating learning data prepared in step S1.
Figure 8:
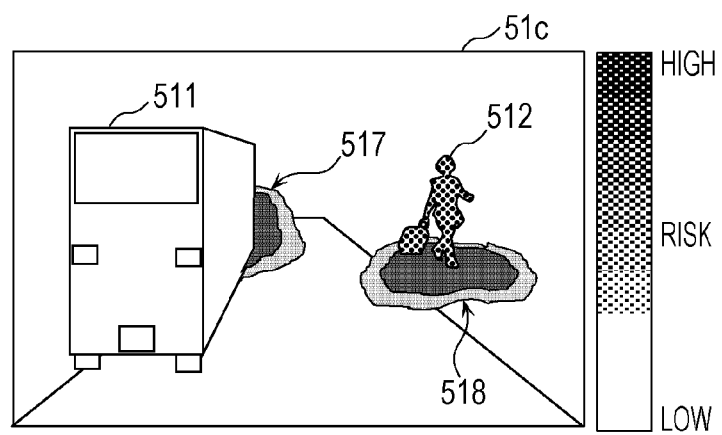
FIG. 8 is a diagram illustrating an example of a set of a risk area and a feature thereof output as a result of a learning process.

FIGS. 7A and 7B illustrate examples of learning images. These are examples of images, extracted from a plurality of images taken in the past by an in-vehicle camera, which actually resulted in dangerous situations. An image 52 illustrated in FIG. 7B includes a bus 511 at rest, a person (pedestrian) 512, and a person (pedestrian) 513 appearing from an area behind the bus 511. An image 51 shown in FIG. 7A includes the bus 511 at rest and the person (pedestrian) 512, but the person 513 is not yet seen although the person 513 exists in an area behind the bus 511.

Figure 7C:
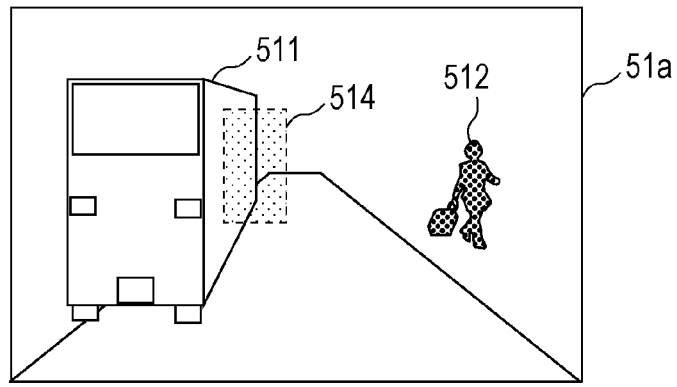
FIG. 7C is a diagram illustrating learning data prepared in step S1.

An image 51a illustrated in FIG. 7C is an example of an annotated image. In this example, an annotation is added to the image 51 so as to indicate an area in which the person will appear a particular time later although the person is not yet seen. More specifically, the image 51a includes the annotation added thereto indicating a risk area where there is a possibility that the person 513 may appear as a moving object into the travelling path of the vehicle, which may collide with the vehicle if the vehicle, having the in-vehicle camera by which the image 51 is taken, simply continues the running.

Figure 7D:
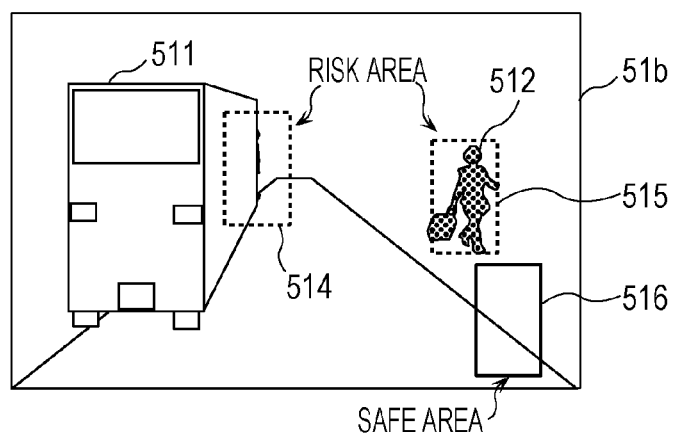
FIG. 7D is a diagram illustrating learning data prepared in step S1.

The manner of adding the annotation indicating the risk area is not limited to the example described above with reference to FIG. 7C in which the image 51a includes the annotation indicating the area 514 behind the bus 511 where there is the yet unseen person 513 who will suddenly appear soon. For example, as illustrated in FIG. 7D, in addition to the area 514, an annotation may also be added the area 515 of the seen person 512 to indicate that this area 515 is a risk area, and annotations may be added to other safe areas (for example, an area 516) to indicate that these areas are safe. Referring again to FIG. 6, a further description is given below.

Next, the computer performs the learning process using the learning data such that the convolutional neural network 10a can function as the risk predictor 10 (S12). More specifically, using the learning image including the risk area and the annotated image obtained by adding the annotation indicating the risk area to the learning image, the convolutional neural network 10a performs a learning process to learn weights of the convolutional neural network 10a to estimate the risk area in the learning image and the feature of the risk area.

For example, it is assumed here that the convolutional neural network 10a performs the learning process using the image 51 including the risk area shown in FIG. 7A as the learning image and the image 51b shown in FIG. 7D as the annotated image obtained by adding the annotation indicating the risk area to the learning image. In this case, the convolutional neural network 10a learns the weights for estimating the likelihood map, such as an image 51c shown in FIG. 8, indicating the risk area and the degree of risk of the risk area. In the image 51c shown in FIG. 8, an area behind the bus 511 at rest and an area of the person 512 are risk areas, and a likelihood 517 for the area behind the bus 511 and a likelihood 518 for the area of the person 512 are superimposed on the image 51c.

In preparing learning data, a process of adding an annotation indicating a risk area to the learning image may be performed manually, for example, by a cloud sourcing worker, or all or part of the process may be performed by a computer. In the following description, it is assumed by way of example that the computer in a learning system performs the process of adding the annotation indicating the risk area to the learning image, and, using the resultant learning data, the convolutional neural network 10a performs the learning process as described below.

Example

Configuration of Learning System

Figure 9:
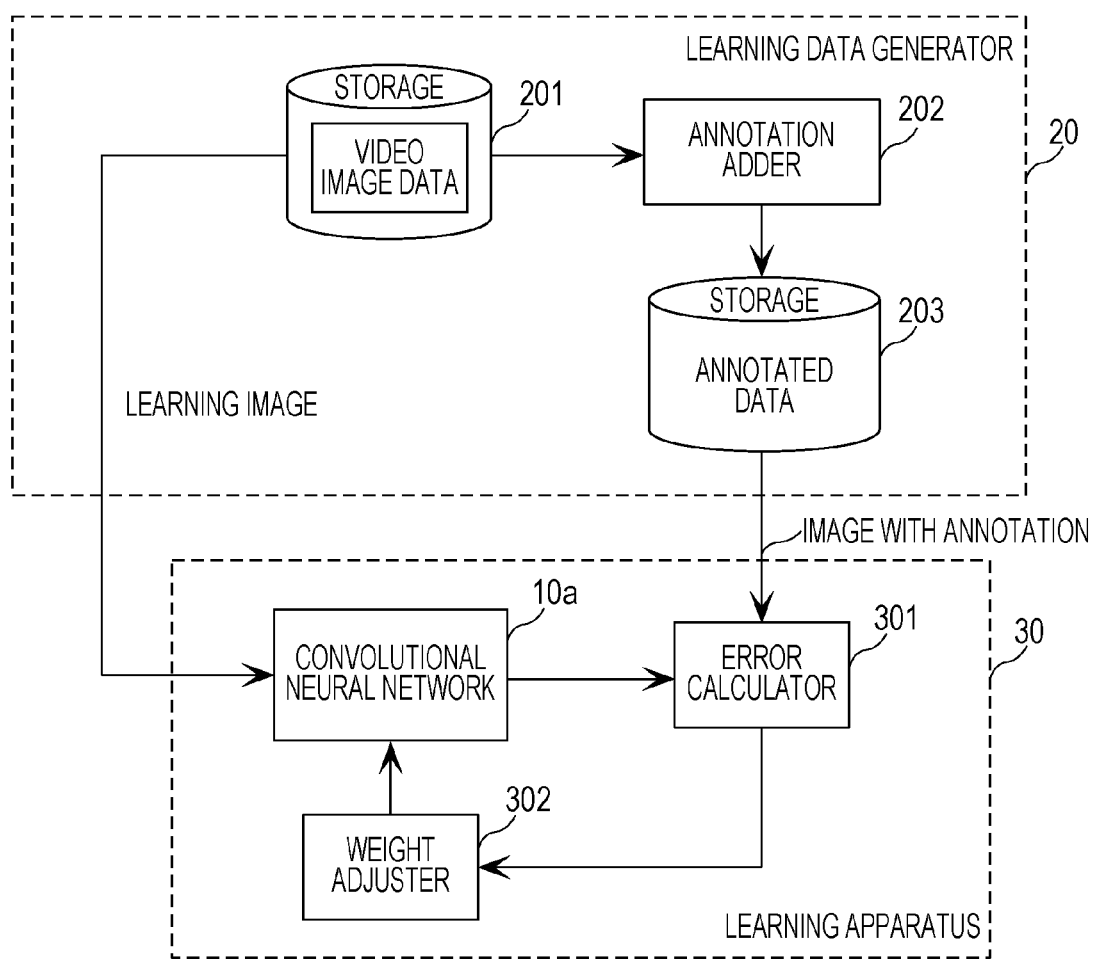
FIG. 9 is a block diagram illustrating an example of a configuration of a learning system according to an embodiment.

FIG. 9 is a block diagram illustrating an example of a configuration of a learning system according to an example. The learning system shown in FIG. 9 includes a learning data generator 20 and a learning apparatus 30, and performs a learning process to realize the risk predictor 10.

The learning data generator 20 includes a storage 201, a storage 203, and an annotation adder 202, and the learning data generator 20 generates learning data from video data. The storage 201 includes a hard disk drive (HDD), a memory, or the like, and stores video data including a series of temporally successive images taken by an in-vehicle camera installed on a vehicle, wherein the video data is also used as learning images. The storage 203 includes a hard disk drive (HDD), a memory, or the like, and stores annotated data, which is data generated by adding indicating a risk area to the learning image (learning data). The annotation adder 202 adds at least an annotation indicating a risk area to a learning image (video data) acquired from the storage 201 and stores resultant data in the storage 203.

The learning apparatus 30 includes an error calculator 301 and a weight adjuster 302, and performs a learning process on the convolutional neural network 10a using learning data acquired from the learning data generator 20. Note that the convolutional neural network 10a has the same structure as that of the convolutional neural network used in the risk predictor 10. After the learning process is completed, the convolutional neural network 10a functions as the convolutional neural network used in the risk predictor 10. The error calculator 301 calculates, using an error function, an error between a value (correct value) indicating a risk area and a feature of this disk area to be estimated correctly by the convolutional neural network 10a and a value (a value indicating a predicted risk) actually output (estimated) by the convolutional neural network 10a. The weight adjuster 302 adjusts weights of the convolutional neural network 10a so as to obtain a smaller value for the error calculated by the error calculator 301.

Operation of Learning System

Figure 10:
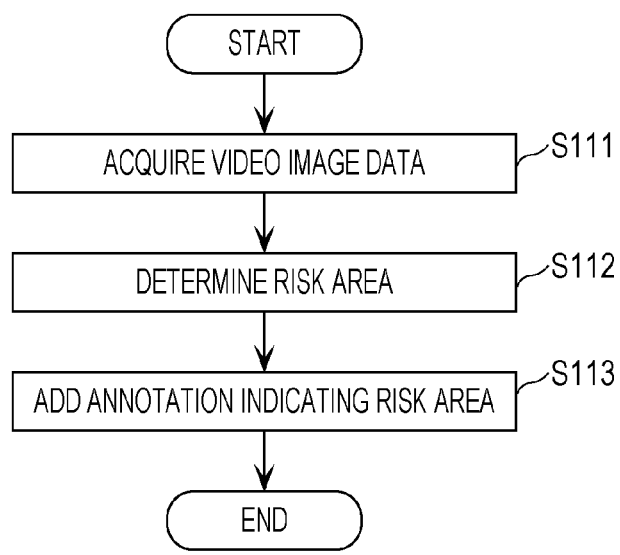
FIG. 10 is a flow chart illustrating a process of generating annotated data performed by a learning data generator.

An operation of the learning system configured in the above-described manner is described below with reference to FIG. 10 and FIG. 11. FIG. 10 is a flow chart illustrating a process of generating annotated data performed by the learning data generator 20. FIG. 11 is a flow chart illustrating a learning process performed by the learning apparatus 30. Note that the process shown in FIG. 10 is an example of a detailed description of S11 shown in FIG. 6, and the process shown in FIG. 11 is an example of a detailed description of S12 shown in FIG. 6.

As shown in FIG. 10, first, the learning data generator 20 acquires video data stored in the storage 201 (S111). More specifically, the learning data generator 20 acquires, as the video data, a plurality of temporally successive images taken by an in-vehicle camera installed on a vehicle.

Next, the learning data generator 20 determines a risk area included in the video data (S112). More specifically, the learning data generator 20 determines a risk area that is included at least in part of the acquired images (video data) and that is an area where there is a possibility that a moving object may appear into a travelling path of a vehicle and there is a possibility that the vehicle having the in-vehicle camera by which the plurality of images are taken may collide with this moving object if the vehicle simply continues the running.

Next, the learning data generator 20 adds an annotation indicating the risk area to the video data (S113). More specifically, the learning data generator 20 adds an annotation indicating the determined risk area to at least part of the images. The learning data generator 20 stores, in the storage 203, the video data (annotated data) at least part of images of which are added with the annotation indicating the risk area. In the present embodiment, as described above, the learning data generator 20 adds an annotation indicating a risk area to a partial area of an image where a yet unseen person will appear a particular time later. However, the manner of adding an annotation is not limited to this example. For example, an annotation indicating a risk area may be added to a particular object area of an image such as an area of a ball, an area of a vehicle with a hazard light being lit on, an area of a curve mirror in which a person is seen, or the like, in which a yet unseen person will appear a particular time later. In any case, an annotation is added such that it indicates a risk area having a possibility that a person 513 appears as a moving object from the risk area into a travelling path of a vehicle having an in-vehicle camera by which the video data is taken and there is a possibility that the vehicle may collide with this person 513 if the vehicle runs further without taking any action.

Next, as shown in FIG. 11, the learning apparatus 30 acquires learning data from the learning data generator 20 (S121). More specifically, the learning apparatus 30 acquires, as the learning image and the annotated image, at least the part of images with the annotation added in S113 and images corresponding to the at least part of images in the plurality of images (video data). More specifically, for example, as described above, the learning apparatus 30 acquires, from the learning data generator 20, the learning image including the risk area shown in FIG. 7A and the annotated image shown in FIG. 7D.

Next, the learning apparatus 30 makes the convolutional neural network 10a output a value indicating the risk estimated using the learning image (S122). More specifically, for example, the learning apparatus 30 makes the convolutional neural network 10a output, as a value indicating a risk estimated for the learning image including the risk area such as that shown in FIG. 7A, values indicating the risk area in the learning image and the feature of this risk area, that is, values indicating the risk area and the degree of risk thereof (the likelihood map).

Next, the learning apparatus 30 calculates a difference (an error) between the value output in the S122 and the value (the correct value) indicating the risk area in the learning image and the feature of this risk area to be estimated by the convolutional neural network 10a (S123). Herein the correct value is the value representing the likelihood map indicating the risk area and the degree of risk of this risk area such as those represented in the image 51c shown in FIG. 8 calculated from the annotated image 51b shown in FIG. 7D having the annotation indicating the risk area.

Next, in a case where the error between the value indicating the risk calculated in S123 and the correct value is not equal to the minimum value (No in S124), the learning apparatus 30 changes the weights of the convolutional neural network 10a such that the difference becomes smaller (S125). The learning apparatus 30 returns to S122 and performs the process described above repeatedly.

In a case where the difference between the value indicating the risk output in S122 and the correct value is equal to the minimum value, the process is ended. That is, the learning apparatus 30 makes the convolutional neural network 10a learn the weights by adjusting the weights of the convolutional neural network 10a such that the error calculated in S123 becomes equal to the minimum value. When the minimum value is achieved for the error calculated in S123, the learning apparatus 30 determines the resultant weights of the convolutional neural network 10a as the weights of the convolutional neural network used in the risk predictor 10.

In the process described above with reference to FIG. 10 and FIG. 11, for simplicity, it is assumed that the generation process and the learning process are performed for one image. However, the generation process and the learning process may be performed for each of sets of 10 to 20 images. In the process described above, it is assumed by way of example that the weights of the neural network 10a are determined so as to obtain the minimum error, and these weights are used as those of the convolutional neural network used in the risk predictor 10. However, alternatively, the weights may be determined as follows. When the iterative process described above is performed until reaching a situation in which no more change occurs in the weights and the errors, the weights of the convolutional neural network 10a in this situation may be employed as the weights of the convolutional neural network used in the risk predictor 10. The minimum error may be defined such that the maximum number of iterations of the iterative process is determined, and the minimum error is defined by a minimum error obtained during the iterations.

First Modification

Figure 12A:
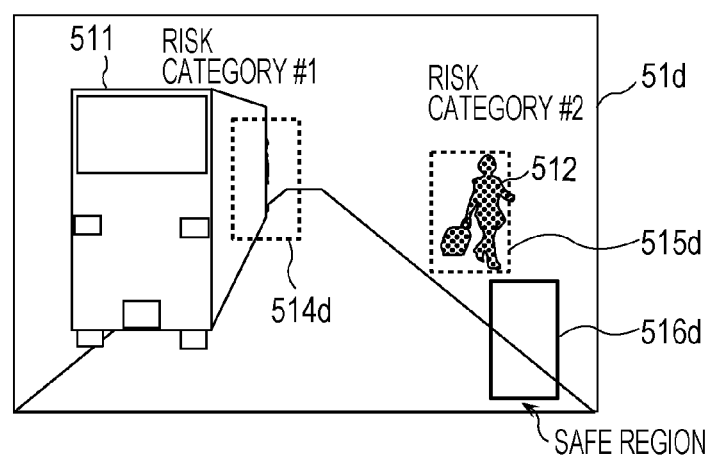
FIG. 12A is a diagram illustrating another example of an annotated image prepared in step S1.
Figure 12B:
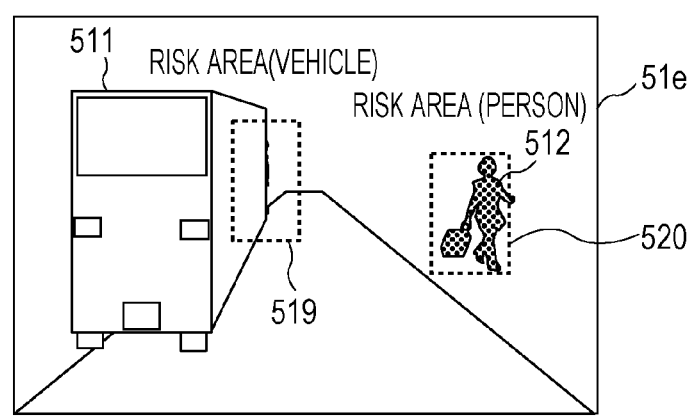
FIG. 12B is a diagram illustrating another example of a set of a risk area and a feature thereof output as a result of a learning process.

FIG. 12A is a diagram illustrating another example of an annotated image prepared in step S1. FIG. 12B is a diagram illustrating another example of a set of a risk area and a feature thereof output as a result of a learning process. In FIGS. 12A and 12B, similar elements to those in FIGS. 7A to 7D and FIG. 8 are denoted by similar reference numerals, and a further detailed description thereof is omitted.

In the above-described learning process of the risk predictor 10, the image 51 shown in FIG. 7A is used as an example of the learning image and the image 51b shown in FIG. 7D is used as an example of the annotated image, and the risk area and the degree of risk thereof represented in the image 51c of FIG. 8 are employed as correct values. However, alternatively, the image 51 shown in FIG. 7A and the image 51d shown in FIG. 12A may be respectively employed as the learning image and the annotated image, and the risk area and the value indicating the category thereof represented in the image 51e of FIG. 12B may be correct values.

In the image 51 shown in FIG. 12A, an area 514d behind a bus 511 at rest is a risk area from which there is a possibility that an unseen person may appear and collide with a vehicle, and "RISK CATEGORY #1" is an annotation indicating a category of the risk area. Furthermore, in the image 51d, annotations are added to indicate an area 515d of a seen person 512 and a category thereof, that is, "RISK CATEGORY #2". That is, the area 515d of the person 512 is a risk area having a risk of collision with a vehicle, and the category of this risk area is "RISK CATEGORY #2".

Furthermore, in the image 51d, annotations are added to other areas (such as an area 516d) to indicate that they are safe areas.

In the image 51e shown in FIG. 12B, it is indicated that an area 519 behind a bus at rest 511 is a risk area, and a category thereof is a "risk area (vehicle)". Furthermore, an area 520 of a person 512 is a risk area and a category thereof is a "risk area (person)".

Second Modification

An annotation added to a learning image is not limited to information (such as a frame) indicating a risk area such as that according to the example described above or a category of a moving object related to the risk area such as that described above in the first modification. For example, vehicle control information in terms of a handle angle or a brake strength of a vehicle as of when a learning image is taken may be employed as an annotation, or the annotation may be detailed area information, such as that shown in FIG. 13, other than an object area.

Figure 13:
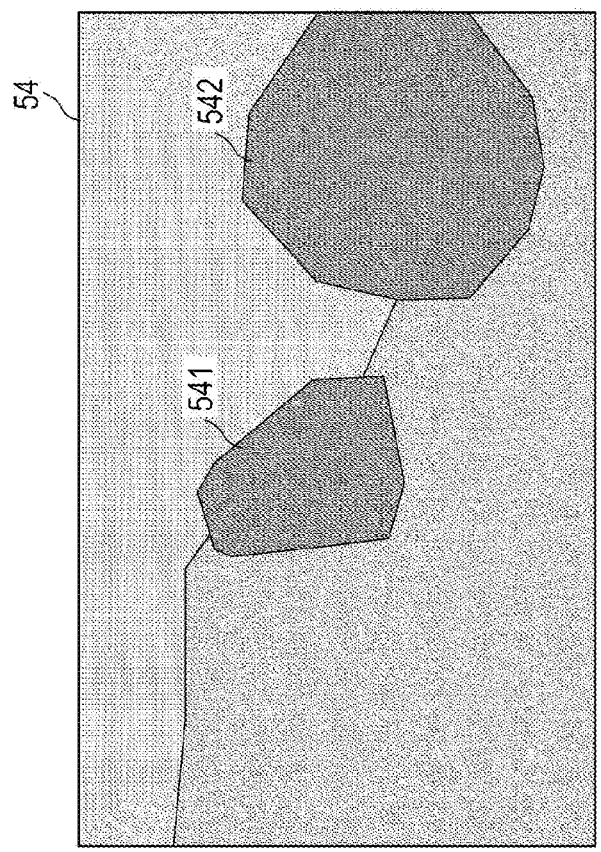
FIG. 13 is a diagram illustrating an example of detailed area information.

FIG. 13 is a diagram illustrating an example of detailed area information. The detailed area information shown in FIG. 13 is, for example, segment information 54 corresponding to FIG. 7A. An area 541 indicates that the area behind the bus 511 shown in FIG. 7A is a risk area, and an area 542 indicates that the area of the person 512 shown in FIG. 7A is a risk area.

As described above, an annotation added to a learning image may indicate a risk area in an input image and control information including information in terms of a brake strength or a handle angle of a vehicle as of when the learning image is taken. An annotation added to a learning image may be segment information of a risk area in an input image.

Third Modification

In the first embodiment, the example, the first and second modifications, described above, the risk area likely to have a risk for a vehicle being running is an area including a part of an area of a hiding object existing in a learning image and an unseen moving object existing behind the hiding object will appear later into a travelling path. However, the risk area is not limited to such an area. For example, the risk area may be an area between two or more moving objects including a person at least one of which has a possibility of moving toward the other one of the moving objects and crossing the travelling path of the vehicle.

Examples of learning images and annotated images used in the learning process on such risk areas are described below.

FIG. 14A, FIG. 15A, FIG. 16A, and FIG. 17A show examples of learning images. FIG. 14B, FIG. 15B, FIG. 16B, and FIG. 17B show examples of annotated images added with annotations indicating risk areas.

Figure 14A:
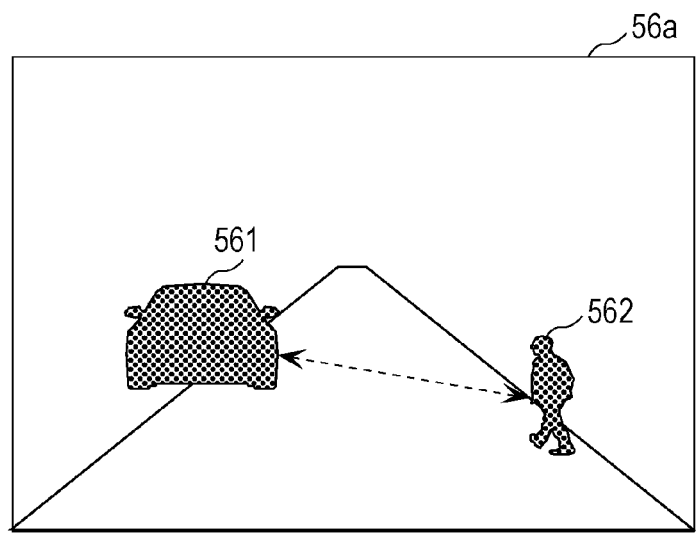
FIG. 14A is a diagram illustrating an example of a learning image.
Figure 14B:
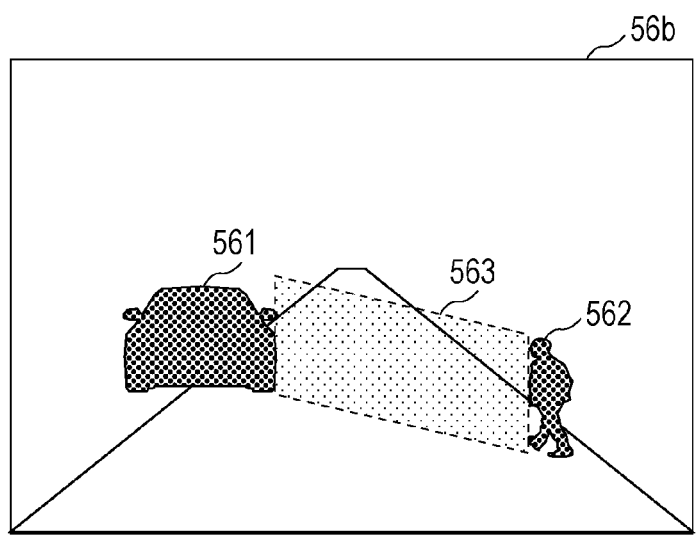
FIG. 14B is a diagram illustrating an example of an annotated image added with an annotation indicating a risk area.

A learning image 56a shown in FIG. 14A includes a vehicle 561 parking or at rest and a person 562. An annotated image 56b shown in FIG. 14B includes an annotation, added to the learning image 56a, to indicate that an area 563 between the vehicle 561 parking or at rest and the person 562 is a risk area.

Figure 15A:
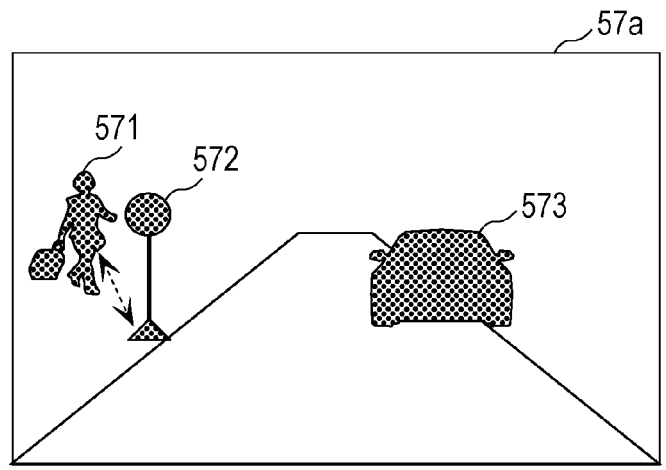
FIG. 15A is a diagram illustrating an example of a learning image.
Figure 15B:
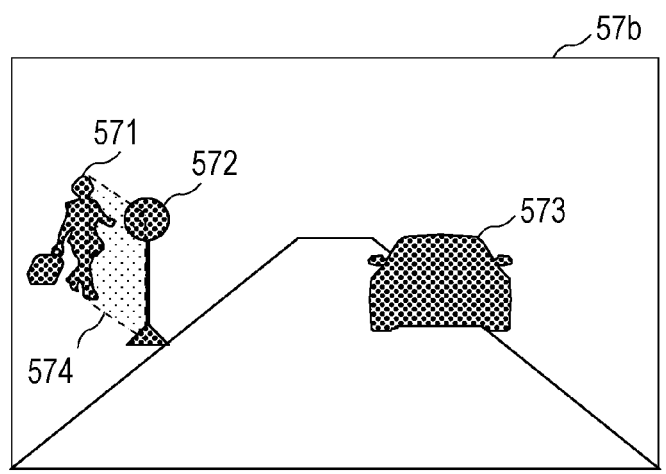
FIG. 15B is a diagram illustrating an example of an annotated image added with an annotation indicating a risk area.

A learning image 57a shown in FIG. 15A includes a person 571, an object 572 which is a bus stop, and a vehicle 573 parking or at rest. An annotated image 57b shown in FIG. 15B includes an annotation, added to the learning image 57a, to indicate that an area 574 between the person 571 and the object 572, which is the but stop, is a risk area.

Figure 16A:
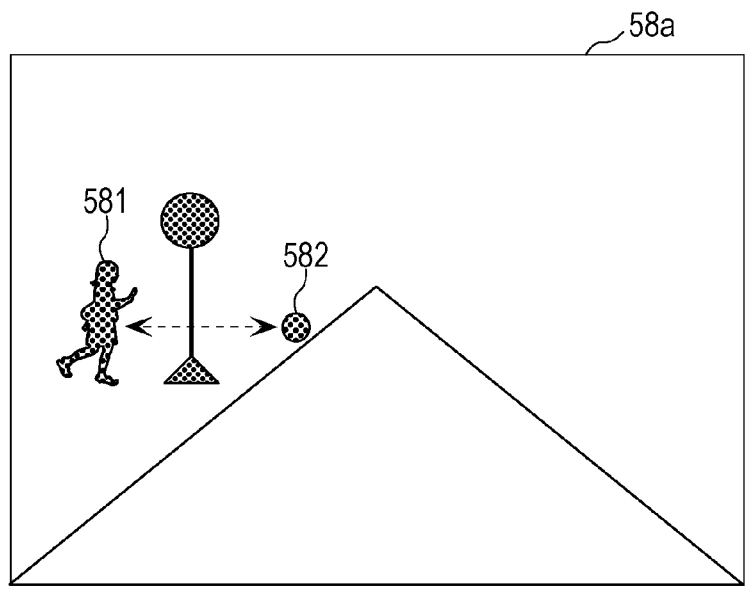
FIG. 16A is a diagram illustrating an example of a learning image.
Figure 16B:
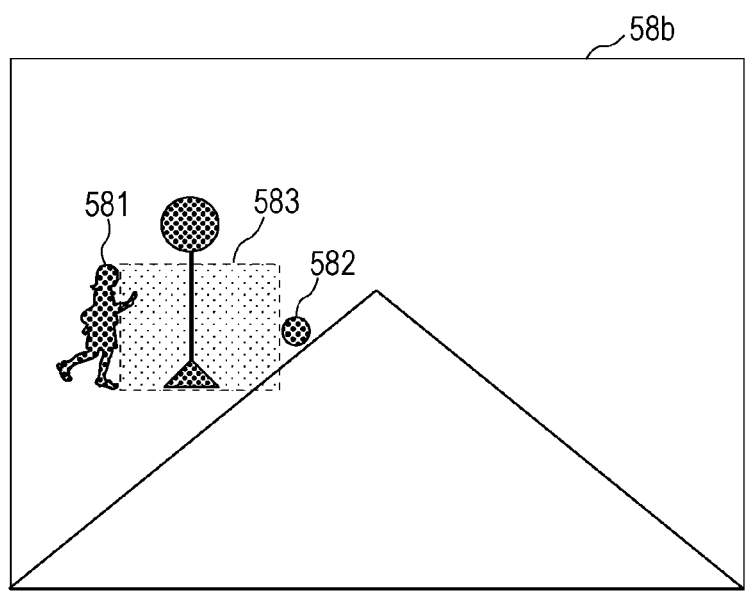
FIG. 16B is a diagram illustrating an example of an annotated image added with an annotation indicating a risk area.

A learning image 58a shown in FIG. 16A includes a person 581 who is a child and an object 582 which is a ball used in playing by the person 581. An annotated image 58b shown in FIG. 16B includes an annotation, added to the learning image 58a, to indicate that an area 583 between the person 581 and the object 582 used in playing by the person 581 is a risk area.

Figure 17A:
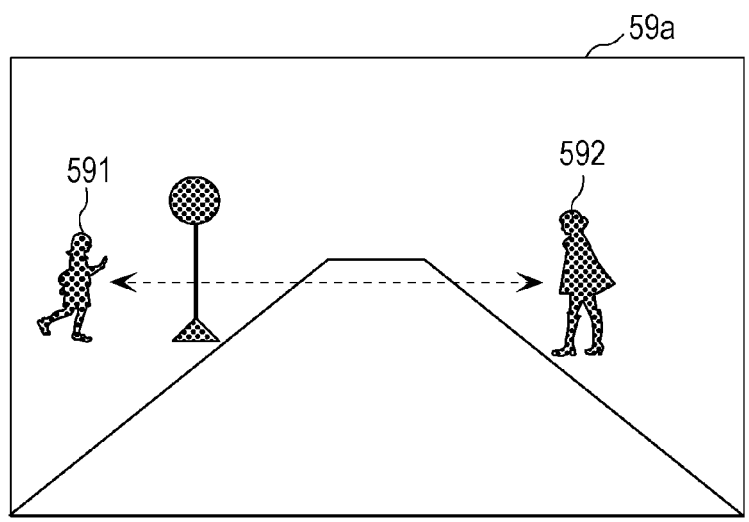
FIG. 17A is a diagram illustrating an example of a learning image.
Figure 17B:
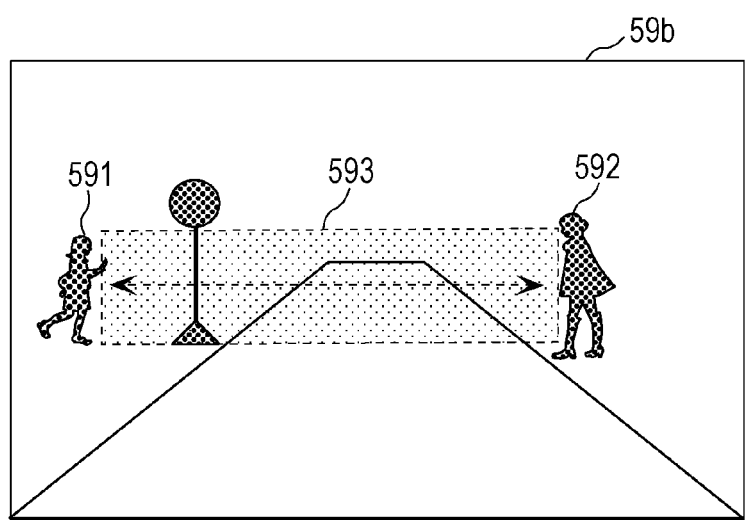
FIG. 17B is a diagram illustrating an example of an annotated image added with an annotation indicating a risk area.

A learning image 59a shown in FIG. 17A includes a person 591 who is a child and a person 592 who is a child's parent or the like. An annotated image 59b shown in FIG. 17B includes an annotation, added to the learning image 59a, to indicate that an area 593 between the person 591 and the person 592 is a risk area.

In the examples described above, there is a possibility that two or more moving objects including persons may move toward each other. In this case, one or both of the moving objects may cross a vehicle travelling path. Thus, an area between two or more moving objects may be a risk area where a moving object may appear in a vehicle travelling path and thus there is a possibility that the moving object may collide with the vehicle if the vehicle simply continues running. Thus, the risk predictor 10 may predict an area between two or more such moving objects as a risk area.

Second Embodiment

In the first embodiment, it is assumed by way of example that learning is performed only using the neural network 10a having the same configuration as that of the convolutional neural network used in the risk predictor 10. However, the manner of learning is not limited to this. Alternatively, first, a first-phase learning process may be performed using a convolutional neural network having a fully connected layer, and then a second-phase learning process may be performed using a convolutional neural network obtained by changing the fully connected layer to a convolutional layer. Such a learning method is described below as a second embodiment. The following description will focus on differences from the first embodiment.

Learning Process

The configuration of the risk predictor 10 is similar to that according to the first embodiment, and thus a further description thereof is omitted. In the second embodiment, the learning process using learning data is performed by a computer in a different manner from the manner according to the first embodiment.

Figure 18:
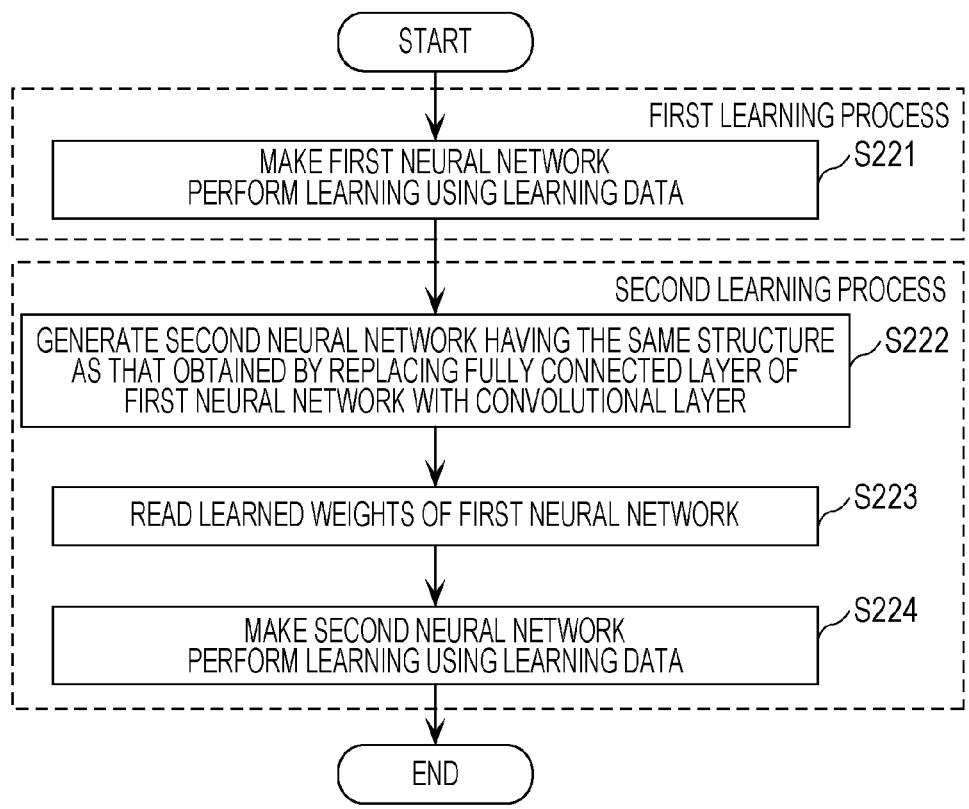
FIG. 18 is a flow chart illustrating an outline of a two-phase learning process according to a second embodiment.
Figure 19:
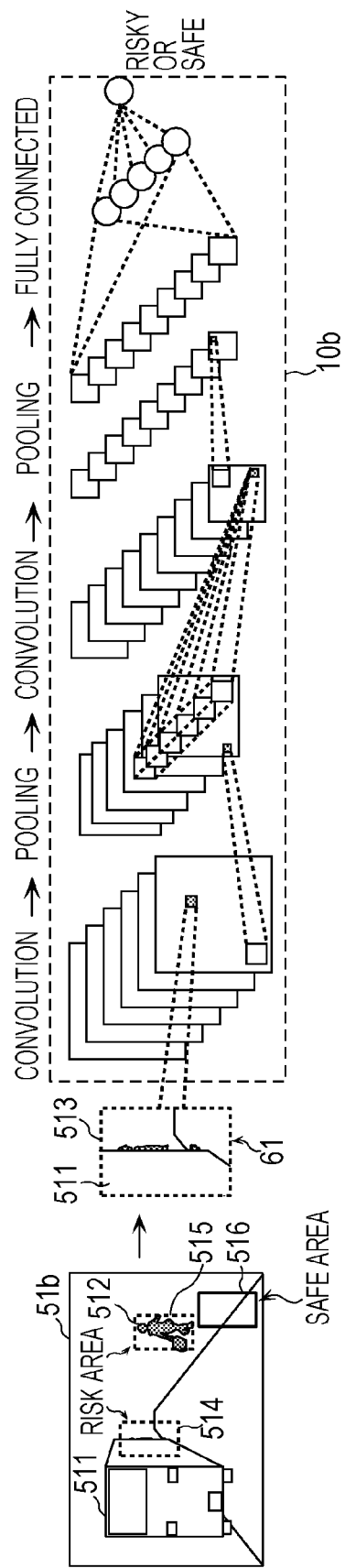
FIG. 19 is a flow chart illustrating a concept of a first-phase learning process.
Figure 20:
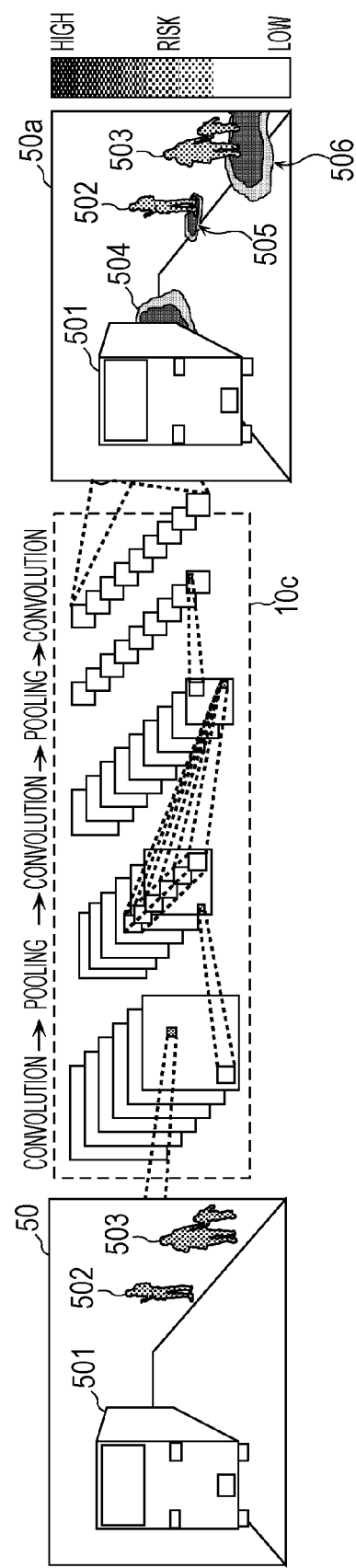
FIG. 20 is a flow chart illustrating a concept of a second-phase learning process.

FIG. 18 is a flow chart illustrating an outline of a two-phase learning process according to the second embodiment. FIG. 19 is a flow chart illustrating a concept of a first-phase learning process. FIG. 20 is a flow chart illustrating a concept of a second-phase learning process. In these figures, similar elements to those in FIG. 3, FIG. 7D, or other figures are denoted by similar reference numerals, and a further detailed description is omitted. The process shown in FIG. 18 is an example of a detailed process of step S12 shown in FIG. 6. A first neural network 10b shown in FIG. 19 is a convolutional neural network having a fully connected layer used in the first-phase learning process. A second neural network 10c shown in FIG. 20 is a convolutional neural network used in the second-phase learning process, and this second neural network 10c has a configuration obtained by changing the fully connected layer of the first neural network 10b to a convolutional layer. The second neural network 10c is the same in configuration as the convolutional neural network used in the risk predictor 10.

First, a computer performs a first learning process in which the first neural network 10b learns weights using learning data (S221). More specifically, by using partial areas of learning images, that is, a risk area image added with an annotation indicating that this area is a risk area and a safe area image added with no annotation, the computer makes the first neural network 10b, which is a convolutional neural network having a fully connected layer, learn the first weight of the first neural network for determining whether the partial area is a safe area or a risk area.

For example, in the example shown in FIG. 19, the computer inputs a risk area image 61, which is a partial image of the annotated image 51b, to the first neural network 10b and makes the first neural network 10b learn the first weight of the first neural network 10b to determine that this risk area image 61 is a risk area.

Next, the computer performs a second learning process in which the second neural network 10c performs learning using learning data (S221 to S224). More specifically, first, the computer generates the second neural network by changing the fully connected layer of the first neural network to a convolutional layer (S222). Next, the computer reads the weight (the first weight) of the first neural network learned in S221 (S223), and changes the initial value of the weight of the second neural network generated in S222 to the first weight. Subsequently, by using the learning image including the risk area and the annotated image generated by adding the annotation indicating the risk area to the learning image, the computer makes the second neural network 10c learns the weight (second weight) of the second neural network 10c for estimating the risk area in the learning image and the feature of the risk area (S224).

For example, in the example shown in FIG. 20, the computer inputs the image 50 as the learning image (input image) to the second neural network 10c and makes the second neural network 10c change (learn) the second weight to estimate a risk in the form of a likelihood map indicating the risk area and the degree of the risk of the risk area.

By performing the second learning process in the above-described manner, it is possible to learn the weight of the convolutional neural network which has the same configuration as that of the second neural network and which is used in the risk predictor 10.

In the first learning process described above, it is assumed by way of example that by using the risk area image added with the annotation indicating the risk area and the safe area image having no annotation as the learning images, the first neural network 10b learns the first weight for determining whether the input learning image is safe or risky. However, other images may be used as learning images.

Figure 21:
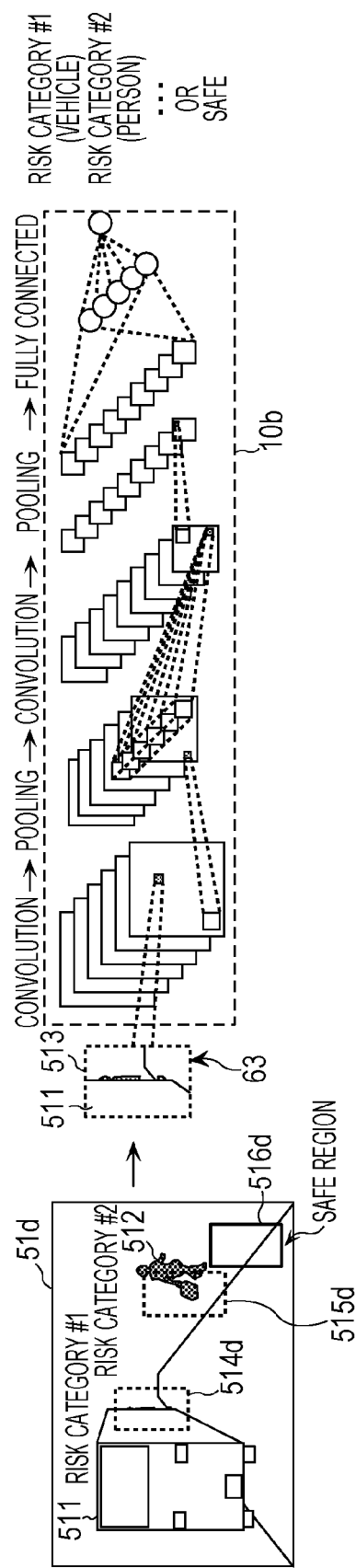
FIG. 21 is another diagram illustrating the concept of the first-phase learning process.

For example, in the first learning process, as illustrated in FIG. 21, a partial area of the learning image including the risk area and the annotation indicating the category of the risk area may be used as the learning image. Using this learning data, the first neural network 10b learns its first weight to determine whether the input learning image includes a risk area or no risk area, and, in a case where it is determined that the input learning image includes a risk area, further determine the category of the risk area.

FIG. 21 is another diagram illustrating the concept of the first-phase learning process.

In the example shown in FIG. 21, the computer generates a risk area image 63 by extracting an area 514d as a partial area of the image 51d including a risk area and an annotation indicating the category thereof, and inputs the resultant risk area image 63 to the first neural network 10b. The computer then makes the first neural network 10b learn the first weight thereof to determine that the risk area image 63 is a risk area and determine the category (risk (vehicle) in the example shown in FIG. 21) of the risk area image 63. There can be many types of risk areas in addition to those described above. Therefore, in the first learning process, to handle such many types of risk areas, the risk category may be divided into subcategories depending on appearances of objects or the like.

The risk output by the risk predictor 10 is not limited to the likelihood map such as that shown in FIG. 20 indicating the risk area and the degree of risk thereof. That is, the second learning process is not limited to the learning process in which the second weight is learned to output, as the risk area and the feature thereof, the likelihood map indicating the risk area and the degree of risk. Alternatively, for example, the second weight may be learned to output the risk area and the category thereof.

Other Embodiments

In the risk prediction method described above with reference to the first to third embodiments, there is no particular restriction on elements or apparatuses that perform the respective processes described above. The processes may be performed using a processor (such as that described below) or the like disposed in a particular local apparatus or may be performed by a cloud server or the like installed at a location different from the location of the local apparatus.

The input image used as the learning image or the input image given in the risk prediction process may be an image (a full image) taken by an in-vehicle camera or a partial image of the full image. The partial image may be an image of an area to be estimated as a risk area as described above. The full image may be an image taken as of when, or as of before, a dangerous situation occurs.

Note that the present disclosure is not limited to the embodiments described above. For example, constituent elements described above may be arbitrarily combined or one or more constituent elements described above may be removed, and a result may be employed as another embodiment according to the present disclosure. Furthermore, it will be apparent to those skilled in the art that various modifications are possible to the embodiments described above without departing from the spirit and the scope according to the present disclosure, that is, without departing from the scope defined in claims.

The present disclosure also includes in its scope the following.

(1) A specific example of the apparatus described above is a computer system including a microprocessor, a ROM, a RAM, a hard disk unit, a display unit, a keyboard, a mouse, and the like. A computer program is stored in the RAM or the hard disk unit. In each apparatus, the microprocessor operates according to the computer program thereby achieving the function of the apparatus. The computer program is a combination of a plurality of instruction codes indicating instructions that are given to the computer to achieve a particular function.

(2) Part or all of the constituent elements of the apparatus described above may be implemented in a single system LSI (Large Scale Integration). The system LSI is a super-multifunction LSI produced such that a plurality of parts are integrated on a single chip. More specifically, the system LSI is a computer system including a microprocessor, a ROM, a RAM, and so on. A computer program is stored in the RAM. In the system LSI, the microprocessor operates according to the computer program thereby achieving the function of the system LSI.

(3) Part or all of the constituent elements of the apparatus described above may be implemented in the form of an IC card attachable to the apparatus or in the form of a single module. The IC card or the module is a computer system including a microprocessor, a ROM, a RAM, and the like. The IC card or the module may include the super-multifunction LSI described above. In the IC card or the module, the microprocessor operates according to the computer program thereby achieving the function of the IC card or the module. The IC card or the module may be configured so as to be resistant against tampering.

(4) The present disclosure may be implemented as a method. The method may be realized by a computer program that is to be executed by a computer or the method may be realized by a digital signal associated with the computer program.

(5) The present disclosure may be implemented by a computer readable storage medium, such as a flexible disk, a hard disk, a CD-ROM, an MO disk, a DVD disk, a DVD-ROM disk, a DVD-RAM disk, a BD (Blu-ray Disc), a semiconductor memory, or the like in which the computer program or the digital signal are stored. The digital signal may be recorded in the storage medium described above.

The present disclosure may be implemented by transmitting the computer program or the digital signal via a telecommunication line, a wired or wireless communication line, a network typified by the Internet, data broadcasting, or the like.

The present disclosure may be implemented by a computer system including a microprocessor and a memory, wherein the computer program is stored in the memory and the microprocessor operates according to the computer program.

The program or the digital signal may be stored in the storage medium and may be transferred, or the program or the digital signal may be transferred via the network or the like thereby allowing the present disclosure to be implemented in another computer system.

The techniques of the present disclosure are applicable, in particular, to the prediction of a risk area where there is a possibility that a dangerous situation occurs, by using a camera installed on an automated driving vehicle or system, or installed in an apparatus or system for assisting driving.

What is claimed is:

1. A risk prediction method executed by a computer of a risk predictor using a convolutional neural network, the method comprising:
   taking an input image by an in-vehicle camera installed on a vehicle;
   acquiring, by the computer using the convolutional neural network, an input image taken by an in-vehicle camera installed on a vehicle;
   making the convolutional neural network estimate a plurality of risk areas, including a first risk area having a detected first moving object, and a second risk area not having a detected moving object detected from a side of the second risk area toward the vehicle as a second moving object, and a degree of risk for each risk area of the plurality of risk areas as a feature of each risk area, each risk area being in the acquired input image,
   the first risk area having a possibility that the detected first moving object in the first risk area may move into a travelling path of the vehicle, and that the detected first moving object in the first risk area may collide with the vehicle, and
   the second risk area having a possibility that the second moving object may appear by a direction from the second risk area into a travelling path of the vehicle, and that the second moving object may collide with the vehicle, the possibility that the second moving object may appear from the second risk area being based on a degree of similarity of the acquired input image to a partial area of an input image taken immediately before, a previous situation where a previous moving object did appear from a previous second risk area not having a detected moving object;

displaying the input image taken by the in-vehicle camera installed on the vehicle on a display installed in the vehicle; and superimposing, by the convolutional neural network, a likelihood map for each risk area of the plurality of risk areas on the input image being displayed on the display installed in the vehicle, wherein the likelihood map for the first risk area includes a first irregularly-shaped boundary line that surrounds the detected first moving object, and wherein the likelihood map for the second risk area includes a partial first irregularly-shaped boundary line associated with the second risk area to show a direction of the second moving object may appear from an other side of the second risk area opposite the vehicle.

2. The risk prediction method according to claim 1, wherein in an outputting, the convolutional neural network is made to further estimate a type of the moving object related to each estimated risk area as the feature of each risk area, and further output the type of the moving object visually displayed outside of each estimated risk area.

3. The risk prediction method according to claim 1, further comprising:

making the convolutional neural network, before the acquiring of the input image, learn a weight of the convolutional neural network by using a learning image including each risk area and an annotated image generated by adding an annotation indicating each risk area to the learning image such that the weight for estimating each risk area in the learning image and the feature of each risk area is learned.

4. The risk prediction method according to claim 3, wherein the learning includes making a first neural network, which is a convolutional neural network including a fully connected layer, learn a first weight of the first neural network by using a risk area image and a safe area image, which are each a partial area of the learning image, the risk area image being the area added with the annotation indicating each risk area, the safe area image being an area to which the annotation is not added, such that the first weight of the first neural network for determining whether the partial area is a safe area or risk area is learned, assigning the learned first weight as an initial value of a weight of a second neural network having a configuration obtained by changing the fully connected layer of the first neural network to a convolutional layer, and making the second neural network learn a second weight of the second neural network for estimating each risk area in the learning image and the feature of each risk area by using the learning image including each risk area and the annotated image generated by adding the annotation indicating each risk area to the learning image, thereby learning the weight of the convolutional neural network having the same configuration as that of the second neural network.

5. The risk prediction method according to claim 3, further comprising:

acquiring a plurality of temporally successive images taken by an in-vehicle camera installed on a vehicle; and determining the second risk area included in at least part of the plurality of acquired images and having a possibility that the second moving object may appear from the second risk area into a travelling path of the vehicle and the second moving object may collide with the vehicle in a case where the vehicle simply continues running; and adding an annotation indicating the determined second risk area to the at least part of the plurality of images, wherein in the learning, the at least part of the plurality images having the added annotation and images corresponding to the at least part of the plurality of images are acquired as the learning image and the annotated image, and the weight of the convolutional neural network is learned using the acquired learning image and the annotated image.

6. The risk prediction method according to claim 3, wherein the second risk area is an area including a part of an area of a hiding object existing in the learning image in a state in which the moving object is hidden behind before the moving object appears from the hiding object into the travelling path.

7. The risk prediction method according to claim 3, wherein the second risk area is an area between two or more moving objects including a person at least one of which has a possibility of moving toward the other one of the moving objects and crossing the travelling path of the vehicle.

8. The risk prediction method according to claim 3, wherein the annotation indicates each risk area and a category of the moving object related to each risk area.

9. The risk prediction method according to claim 3, wherein the annotation indicates each risk area and control information including information in terms of a brake strength or a steering wheel angle of the vehicle as of when the learning image is taken.

10. The risk prediction method according to claim 3, wherein each annotation is segment information on each risk area.

11. The risk prediction method according to claim 1, wherein at least one of the acquiring and the outputting is performed by a processor of the computer.

* * * * *